Jan. 5, 1960
C. B. HOUSE
2,920,217
ARBITRARY WAVEFORM GENERATOR
Filed May 14, 1957
3 Sheets-Sheet 1
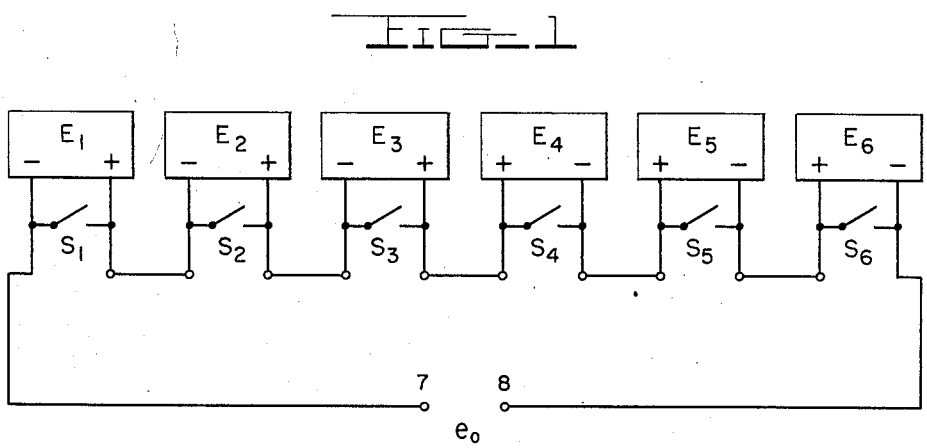
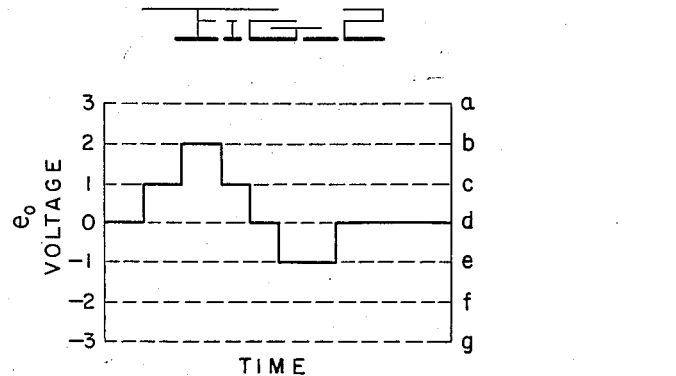
INVENTOR
CLARENCE B. HOUSE
BY
ATTORNEYS Jan. 5, 1960 C. B. HOUSE 2,920,217
ARBITRARY WAVEFORM GENERATOR
Filed May 14, 1957 3 Sheets-Sheet 2
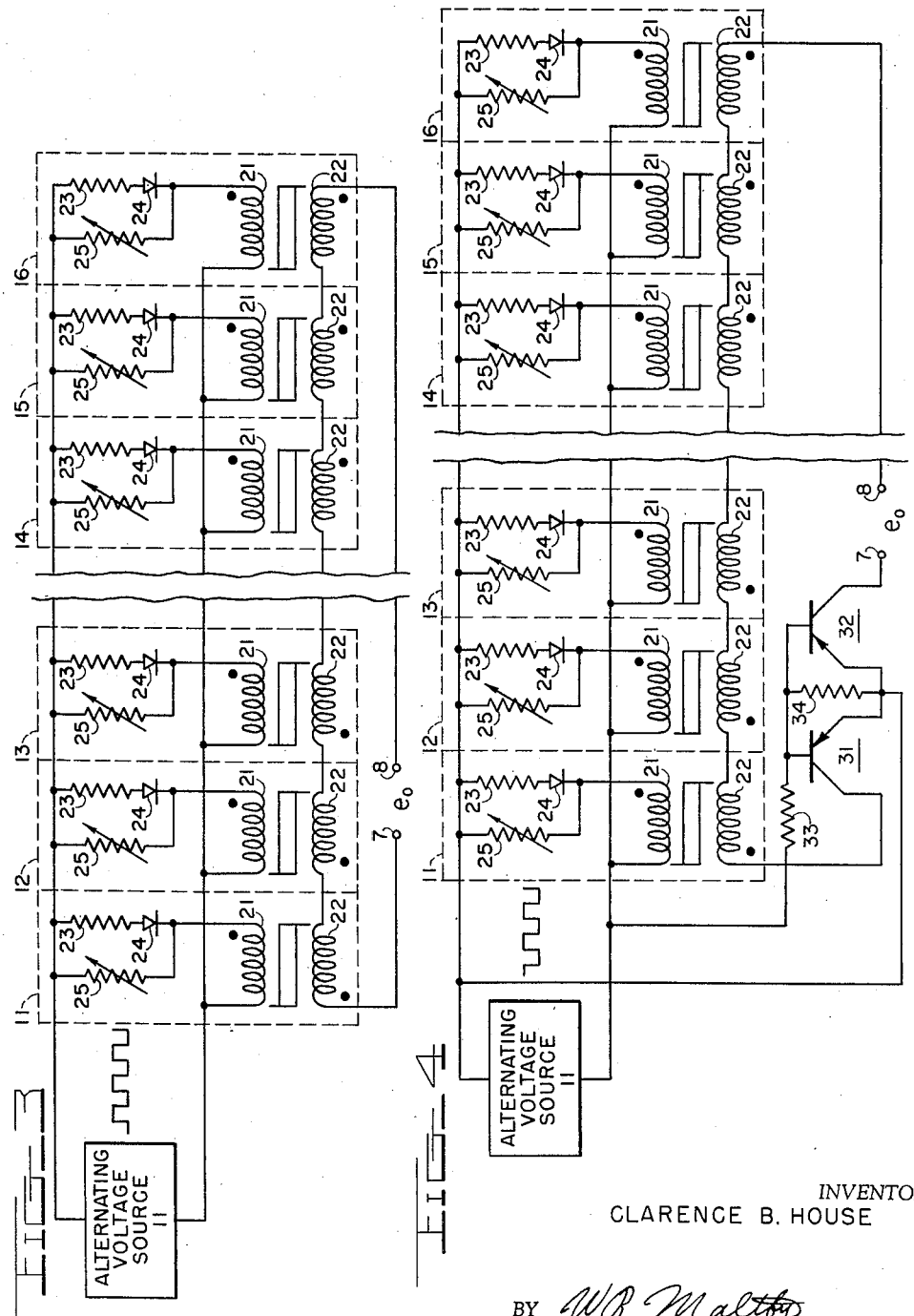
INVENTOR
CLARENCE B. HOUSE Jan. 5, 1960

C. B. HOUSE 2,920,217

ARBITRARY WAVEFORM GENERATOR

Filed May 14, 1957

INVENTOR
CLARENCE B. HOUSE

BY W.R. Maltby
Richard C. Reed
ATTORNEYS

United States Patent Office 2,920,217
Patented Jan. 5, 1960

2,920,217
ARBITRARY WAVEFORM GENERATOR

Clarence B. House, Arlington, Va.

Application May 14, 1957, Serial No. 659,188

9 Claims. (Cl. 307—106)

(Granted under Title 35, U.S. Code (1952), sec. 266)

The invention described herein may be manufactured and used by or for the Government of the United States of America for governmental purposes without the payment of any royalties thereon or therefor.

This invention relates in general to arbitrary waveform generators and in particular to such generators employing magnetic core elements having a substantially rectangular hysteresis loop characteristic.

Function or arbitrary waveform generators of various different kinds are commonly used in a wide variety of electronic applications. They are particularly useful in the electronic computer field where the waveform of the input voltage is usually of considerable significance.

In general, the requirements of an ideal function generator for use in computer applications include simple alignment, reliability, repeatability and the ability to produce steps as part of the output function. In addition, it is frequently desirable that the generator be a completely static device to correspond with cooperating devices.

Therefore:

It is an object of this invention to provide an improved arbitrary waveform generator capable of producing a substantially unlimited number of different waveforms.

It is another object of this invention to provide an improved arbitrary waveform generator employing static components.

It is still another object of this invention to provide an improved arbitrary waveform generator which is relatively insensitive to load impedance variations.

Other objects of the invention will become apparent upon a more comprehensive understanding of the invention for which reference is had to the following detailed description of the invention and the accompanying drawings, in which:

Fig. 1 is a schematic showing of a simplified embodiment of the present invention.

Fig. 2 is a graphical showing of possible output voltages for the embodiments of Figs. 1 and 3.

Fig. 3 is a schematic showing of a preferred embodiment of the present invention.

Fig. 4 is a schematic showing of another preferred embodiment of the present invention.

Figure 5:
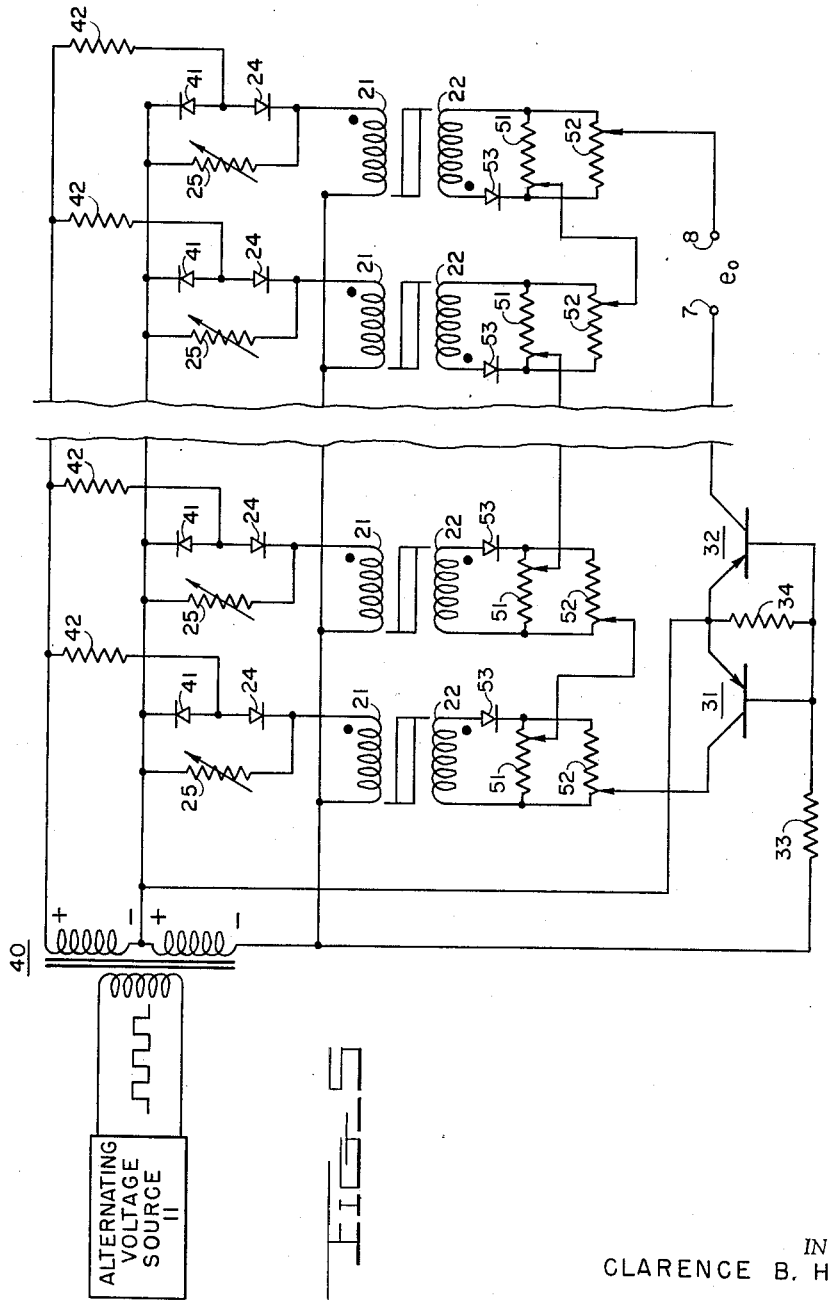
Fig. 5 is a schematic showing of still another preferred embodiment of the present invention.

Briefly, the device of this invention produces any selected output waveform by the time controlled summation of positive and negative voltages of controlled magnitude. In its basic form, the device employs a determinate number of positive voltage sources and an equal number of negative voltage sources which are connected in series opposition to produce a zero difference voltage when all the voltage sources are applied across the output load. Means are provided for effectively removing any selected number of positive or negative voltage sources during a prescribed time interval such that a difference voltage equal in magnitude to the algebraic sum of the removed voltage sources and of opposite polarity with respect thereto appears across the output load impedance. Magnetic switching circuitry is employed to control the operation of the device and a single alternating voltage source is employed to provide a plurality of voltage sources in the preferred embodiments of the device.

Referring now to the drawings in detail:

In Fig. 1, six voltage sources are shown serially connected in opposition across the output terminals 7 and 8 with three of each polarity. It is understood that while, for purpose of simplicity, only six voltage sources are shown, more than six voltage sources may be utilized if desired. For purposes of this explanation, the six voltage sources $E_1$, $E_2$, $E_3$, $E_4$, $E_5$ and $E_6$, will be considered equal in value and of the polarity indicated so that with all of the on-off bypass switches $S_1$, $S_2$, $S_3$, $S_4$, $S_5$ and $S_6$ in their open state, the voltage sources sum to zero and no net output voltage $e_0$ appears across the output terminals 7 and 8.

It will be seen that by closing any selected number of switches, a corresponding number of voltage sources will be shorted out and a voltage equal in magnitude to the summation of the removed voltage sources will appear across the output terminals 7 and 8. This operational state will remain, of course, until the switching arrangement is revised.

The stepwise effect of closing the switches in the embodiment of Fig. 1 will be more fully appreciated upon consideration of Fig. 2 which shows $e_0$, the output voltage appearing across the terminals 7 and 8, plotted against time. In Fig. 2, each of the dotted lines, a, b, c, d, e, f, and g, represents a voltage level which may appear across the output terminals on closing various combinations of switches in the embodiment of Fig. 1.

The solid line curve represents a typical output waveform obtainable with the embodiment of Fig. 2 by the selected closure of various bypass switches in time sequence.

A more complex embodiment of the present invention is shown in Fig. 3. This embodiment utilizes an alternating voltage source and a plurality of half cycle response magnetic amplifiers to produce a stepwise output voltage waveform rather than a plurality of separate D.C. voltage sources with on-off bypass switches. As in Fig. 1, for purposes of simplicity, only six half-cycle magnetic amplifiers are shown, but it is understood that a greater number may be utilized, if desired. As indicated in the drawing, the alternating voltage source 11 may be a square wave generator and it has been found that this type of supply voltage is especially adaptable to the present invention. Of course, for special applications it might be preferable to employ other input waveforms such as sinusoidal or triangular. However, since these other waveforms would tend to restrict the flexibility of the output waveforms, only a square wave input waveform will be considered herein. It will be appreciated that the basic principles discussed herein also will apply if other waveforms are employed.

Each of the half cycle response magnetic amplifier units 12, 13, 14, 15, 16 and 17 operates independently of the others and is enclosed by dashed lines in the drawing. Each unit comprises a primary winding 21 and a secondary winding 22 wound on a magnetic core of a material having a substantially rectangular hysteresis loop characteristic with the primary winding connected across the voltage source 11 via a nonreciprocal impedance circuitry comprising a low resistance 23 and a unidirectional element 24 in series, shunted by a relatively high variable resistance 25.

As is well known to those skilled in the art, the output of the type of transformer above referred to is dependent upon the saturation condition of the transformer core. That is, a voltage output is obtained only during the period when the flux level of the core is changing. Once a flux saturation level is reached, the voltage output effectively drops to zero.

In general operational analysis of the half-cycle magnetic amplifier circuitry, the firing angle of a core during the gating half-cycle of such units is uniquely determined during the preceding half-cycle, which is known as the reset half-cycle, by the resetting voltage applied. In the embodiment of Fig. 3, the reset half-cycle is that during which the unidirectional elements block current flow through themselves. Considering the magnetic amplifiers separately, the voltage appearing across the primary winding 21 and the secondary winding 22 during the reset half-cycle is established by the magnitude of the output of voltage source 11 minus the voltage drop across the resistance 25. Thus it will be seen that the amount of reset of each core may be individually controlled by varying its respective resistance 25.

When the polarity of voltage source 11 reverses, the gating half-cycle begins and the unidirectional element in series with the primary winding 21 conducts and substantially the full output of voltage source 11 is applied across the primary winding 21 as the drop across the resistance 23 is negligible while the core is in the nonsaturated condition. As shown in the drawing, the secondary windings on each core are connected in series across the output terminals and thus the voltages appearing across the secondary windings add. Considering an equal turns ratio for the transformers, and an equal number of secondary windings of each polarity, it will be appreciated that the voltages will sum to zero across the output terminals 7 and 8 when the polarity of the voltage source 11 reverses.

As soon as a core saturates, its transformed voltage disappears and a voltage equal in magnitude and opposite in polarity to that which disappeared appears across the output terminals 7 and 8. If the next core to saturate has the same polarity as the preceding one, the voltage appearing across the output will increase. On the other hand, if the next core to saturate does not have the same polarity as the preceding one, the voltage appearing across the output terminals 7 and 8 will decrease and reverse the slope of the output waveform. It will be seen that this synthesizing action continues either until the gating half-cycle is ended or until all cores have saturated, whichever occurs first.

It will be appreciated that the number of voltage levels or points which may be included in a specified waveform is controlled by the number of voltage steps of each polarity available. For example, considering Fig. 2 again, an embodiment employing only six magnetic amplifier units such as shown in Figs. 1 and 3 could not produce a waveform which started at zero, went to a point on line $a$, then to a point on line $g$ and return to line $a$ since this would require nine positive and six negative steps and only three of each are available ultilizing the embodiments of Figs. 1 and 3. An equivalent waveform could be synthesized, however, by going to line $c$, then line $e$ and return. This procedure is possible with the embodiments of Figs. 1 and 3 since it requires only three positive and two negative steps.

It will be seen that for a given number of magnetic amplifier units, it might be preferred in order to fit complex curves, for example, to employ different voltage values for some of the steps shown in the graph of Fig. 2. A means for accomplishing this effect will be dealt with in the discussion of Fig. 5.

While the theoretical waveform shown in Fig. 2 depicts an abrupt change from the one voltage level to another, it will be appreciated that in the practical case, the change will not occur instantaneously but will occur over a short period of time due to the slight residual slope of the saturating cores which in turn gives a slope to the theoretically perpendicular lines of the curve. Of course, the overall smoothness of the curve is fixed by the number of steps utilized. An averaging output meter also improves the smoothness of the curve.

The circuitry shown in Fig. 3 is operable and is entirely suitable for a wide variety of applications wherein the output load current requirements are relatively low. It has been found advisable to limit the output current which flows through each of the secondary windings to a value somewhat less than the magnetizing current of the transformers, that is, less than the current required to change the flux level of the transformer core material.

Where a greater amount of output load current is required, and the embodiment of Fig. 3 would not be satisfactory, the embodiment of Fig. 4 may be advantageously substituted therefor. In the embodiment of Fig. 4 a polarity sensitive switch has been incorporated to interrupt the output load circuitry during the reset half-cycle when the primary windings are most sensitive to load current in the secondary windings. It will be seen that this sensitivity is primarily due to the relatively high impedance 25 in series with each core during the reset half-cycle. Any current flow in the secondary windings resulting from unbalanced voltages in the output circuitry changes the effective primary current and thus the voltage drop across the primary in the resetting circuit. With the inclusion of the polarity sensitive switch, this unbalanced voltage now appears across the switch and does not effect any core. Thus the voltage appearing across the transformer windings is solely dependent upon the respective primary current and the respective turns ratio involved. In Fig. 4 an A.C. or "two way" junction transistor switch is employed to interrupt the output circuitry during the reset half-cycle. This type of switch is well known in the art and is fully described in the article by R. L. Bright which appeared in A.I.E.E. Transactions, paper 55–156, Communication and Electronics, No. 17, pp. 111–121, March 1955. In brief explanation of the operation of this type of switch, however, when the common emitter electrode becomes positive with respect to the common base electrodes in the two transistors 31 and 32, due to the polarity of voltage source 11, both transistors conduct. Thus during the gating half-cycle, the switch impedance drops to a few ohms and places no limit, effectively upon load current flow. When the polarity of the output of voltage source 11 reverses during the reset half cycle, the common emitter electrodes become negative with respect to the common base electrodes in the two transistors and the transistors block. In the circuitry shown, the resistor 33 serves to set the base current and resistor 34 serves to limit the back voltage applied to the base-emitter junction when the switch is in the open or blocking state. A two way transistor switch has been employed to allow for secondary circuit flow in either direction due to the possibility of an unbalanced voltage condition of either polarity. Of course, it is not essential to this invention that a transistorized switching means be employed, and any suitable polarity sensitive on-off switching means may be readily substituted therefor.

The Fig. 5 depicts still another embodiment of the present invention wherein non-linear current limiting means are provided for controlling the current flow in the primary winding 21 during the gating half-cycle when load current in the secondary winding 22 flows out of the dotted end thereof. This load current results in an increase in current in the primary winding. In the absence of the non-linear impedance means, as in Figs. 3 and 4, for example, this increased current in the primary winding 21 will result in an increased IR drop across the post saturation current limiting resistor 23 and thus will reduce the voltage across the primary winding 21 which, in turn, will increase the time required to return the core to saturation. In the embodiment of Fig. 5, however, the non-linear current limiting means, a forward current biased diode unit, presents a low impedance to current flow from the bottom half of the secondary winding of transformer 40 through the unidirectional elements 24 and 41 until the current in primary winding 21 exceeds the value of bias current through the unidirectional element 41 as established by the top of the secondary winding of transformer 40 and the resistance 42. After core saturation, the total primary current is limited by the resistance 42. It is understood that the purpose of the transformer 40 is merely to provide an additional alternating voltage source operating in synchronization with the voltage source 11 and that a separate voltage source synchronous with the voltage source 11 may be readily substituted in place thereof.

It will be appreciated that current may also flow into the dotted end of the secondary windings on nonsaturated cores during the gating half-cycle in the embodiments of Figs. 3 and 4. It has been found that this current will have relatively no effect upon the primary winding current, if the impedance of voltage source 11 is comparatively low, until the secondary current exceeds a value equal to magnetizing current for the core. When this point is reached, however, the voltage across the primary winding rises above the output of the voltage source 11 and the conducting unidirectional means 24 then blocks. At this state, the core voltage is no longer fixed by the voltage source 11 but then is determined by the unbalanced voltage across the secondary windings less the voltage drop across the load impedance. Thus, the increased voltage across the primary causes the core to proceed toward saturation at a faster rate than was set by the previous half-cycle resetting operation. This disadvantageous effect may be greatly reduced by limiting the voltage across each of the secondary windings. In the embodiment of Figure 5, a nonlinear impedance means is employed for this purpose. This nonlinear impedance means comprises the parallel connected potentiometers 51 and 52 plus the unidirectional element 53 by which the potentiometers 51 and 52 are connected across the secondary winding 22.

During the gating half-cycle, the transformed voltage appearing across the secondary winding will cause a current flow through the parallel potentiometers. It will be appreciated that this direction of current flow will not seriously affect the secondary winding terminal voltages since the current is supplied by a low impedance source, the voltage source 11. In this condition, load current flowing into the dot will not effect the secondary winding terminal voltage until the load current drop across the parallel potentiometers equals the transformed primary voltage. Even then, the excess voltage will not be applied to the core due to the presence of the unidirectional element 53 which is polarized to block current flow into the potentiometers 51 and 52 during the reset half-cycle.

As an added feature of the secondary circuitry shown in Fig. 5, the dual potentiometer arrangement permits a variation of the magnitude and/or polarity of each step. It will be seen that a single potentiometer would serve equally as well as the dual potentiometer arrangement, insofar as maintaining the transformed primary voltage across the secondary winding it shunts. The substitution of a single potentiometer would permit a variation of magnitude, but not polarity, of each step.

As an example of the utility of the device of this invention, a twelve magnetic amplifier unit embodiment, in accordance with the embodiment of Fig. 5, has been used successfully as an input wave-form generator with the transcendental function analogue computer described and claimed in the copending application of R. L. Van Allen, Serial No. 619,651, now Patent No. 2,808,990 which is entitled "Polarity Responsive Voltage Computing Means."

In this twelve magnetic amplifier unit the following component values were exemplarily employed: The primary windings 21 of the saturable transformer were designed for a 200 cycle 72 volt peak to peak square wave voltage. The turns ratio was 1:6, giving an output of 6 volts per step. The variable resistance 25 was 25,000 ohms, the resistance 42 was 2000 ohms, the unidirectional elements 23, 41 and 53 were type IN38 rectifiers, and the potentiometers 51 and 52 were 500 ohms each. It is understood, of course, that the values given above are for a particular embodiment and are not to be construed as critical to all embodiments.

It has been found that the arbitrary waveform generator, as described and claimed herein, will produce an output waveform having any desired magnitude, slope polarity and points of inflection and that each of these waveform characteristics are readily variable.

Finally, it is understood that the invention is to be limited only by the scope of the claims appended hereto.

What is claimed is:

1. A magnetic waveform generator comprising a plurality of half-cycle response magnetic amplifier units, each of said units including a primary winding and a secondary winding wound on a core of a material having a substantially rectangular hysteresis loop characteristic, first means for bringing the core in each of said units from its respective flux saturation level to a respective predetermined flux level, said first means including means for varying said predetermined flux level in each of said units independently of the remainder of said units; means for concurrently returning each of the cores in said units to their respective original saturation levels at a common flux changing rate following the operation of said first means; a pair of output terminals; and means interconnecting said secondary windings in series across said output terminals.

2. A magnetic waveform generator comprising a plurality of half-cycle response magnetic amplifier units, each of said units including a primary winding and a secondary winding wound on a core of a material having a substantially rectangular hysteresis loop characteristic, first means for bringing the core in each of said units from its respective flux saturation level to a respective predetermined flux level, said first means including means for varying said predetermined flux level in each of said units independently of the remainder of said units; means for concurrently returning each of the cores in said units to their respective original saturation levels at a common flux changing rate following the operation of said first means; a pair of output terminals; means interconnecting said secondary windings in series across said output terminals and switching means operable to interrupt said serial connection of secondary windings during the operation of said first means.

3. A magnetic waveform generator comprising a plurality of half-cycle response magnetic amplifier units, each of said units including a primary winding and a secondary winding wound on a core of a material having a substantially rectangular hysteresis loop characteristic, first means for bringing the core in each of said units from its respective flux saturation level to a respective predetermined flux level, said first means including means for varying said predetermined flux level in each of said units independently of the remainder of said units; means for concurrently returning each of the cores in said units to their respective original saturation levels at a common flux changing rate following the operation of said first means; said means for returning said cores to their respective saturation levels including current limiting means for limiting current flow in each of said primary windings after the respective saturation level is reached; a pair of output terminals; and means interconnecting said secondary windings in series across said output terminals.

4. A magnetic waveform generator comprising a plurality of half-cycle response magnetic amplifier units, each of said units including a primary winding and a secondary winding wound on a core of a material having a substantially rectangular hysteresis loop characteristic, first means for bringing the core in each of said units from its respective flux saturation level to a respective predetermined flux level, said first means including means for varying said predetermined flux level in each of said units independently of the remainder of said units; means for concurrently returning each of the cores in said units to their respective original saturation levels at a common flux changing rate following the operation of said first means; said means for returning said cores to their respective saturation levels including nonlinear current limiting means for limiting current flow in each of said primary windings after the respective saturation level is reached; a pair of output teminals; means interconnecting said secondary windings in series across said output terminals; and switching means operable to interrupt said serial connection of secondary windings during the operation of said first means.

5. A magnetic waveform generator comprising a plurality of half-cycle response magnetic amplifier units, each of said units including a primary winding and a secondary winding wound on a core of a material having a substantially rectangular hysteresis loop characteristic; and alternating voltage source; each of said primary windings in said plurality being connected in parallel across said voltage source via respective nonreciprocal impedance means comprising unidirectional means and a low impedance connected in series and a relatively high impedance which shunts said unidirectional means and said low impedance; a pair of output terminals; and means interconnecting said secondary windings in series across said pair of output terminals such that at least one of said secondary windings is of opposing polarity with respect to the remainder of said secondary windings.

6. A magnetic waveform generator comprising a plurality of half-cycle response magnetic amplifier units, each of said units including a primary winding and a secondary winding wound on a core of a material having a substantially rectangular hysteresis loop characteristic; an alternating voltage source; each of said primary windings in said plurality being connected in parallel across said voltage source via respective nonreciprocal impedance means comprising unidirectional means and a current limiting means connected in series and a relatively high impedance which shunts said unidirectional means and said current limiting means; said current limiting means being operable to limit current flow in each of said primary windings when the respective core reaches saturation; a pair of output terminals; and means interconnecting said secondary windings in series across said pair of output terminals such that at least one of said secondary windings is of opposing polarity with respect to the remainder of said secondary windings.

7. A magnetic waveform generator comprising a plurality of half-cycle response magnetic amplifier units, each of said units including a primary winding and a secondary winding wound on a core of a material having a substantially rectangular hysteresis loop characteristic; an alternating voltage source; each of said primary windings in said plurality being connected in parallel across said voltage source via respective nonreciprocal impedance means comprising unidirectional means and a nonlinear current limiting means connected in series and a relatively high impedance which shunts said unidirectional means and said nonlinear current limiting means; said nonlinear current limiting means being operable to limit current flow in each of said primary windings when the respective core reaches saturation; a pair of output terminals; and means interconnecting said secondary windings in series across said pair of output terminals such that at least one of said secondary windings is of opposing polarity with respect to the remainder of said secondary windings.

8. A magnetic waveform generator comprising an even plurality of half-cycle response magnetic amplifier units, each of said units including a primary winding and a secondary winding wound on a core of a material having a substantially rectangular hysteresis loop characteristic; an alternating voltage source; each of said primary windings in said plurality being connected in parallel across said voltage source via respective nonreciprocal impedance means comprising unidirectional means and a low impedance connected in series and a relatively high impedance which shunts said unidirectional means and said low impedance; a pair of output terminals; and means interconnecting said secondary windings in series across said pair of output terminals such that one half of said secondary windings are are of opposing polarity with respect to the remainder of said secondary windings.

9. A magnetic waveform generator comprising a plurality of half-cycle response magnetic amplifier units, each of said units including a primary winding and a secondary winding wound on a core of a material having a substantially rectangular hysteresis loop characteristic; an alternating voltage source; each of said primary windings in said plurality being connected in parallel across said voltage source via respective nonreciprocal impedance means comprising unidirectional means and current biased diode current limiting means connected in series and a relatively high impedance which shunts said unidirectional means and said current limiting means; said current limiting means being operable to limit current flow in each of said primary windings when the respective core reaches saturation; a pair of output terminals; means interconnecting said secondary windings in series across said output terminals; voltage limiting means connected in parallel with each of said secondary windings; and switching means operable to interrupt said serial connection of said secondary windings during the period said unidirectional means block current flow.

References Cited in the file of this patent

UNITED STATES PATENTS

| | | |
|---|---|---|
| 565,740 | Goold | Aug. 11, 1896 |
| 861,155 | Achard | July 23, 1907 |